G. H. WHEARY.
SLIDABLE TRUNK HOLDER.
APPLICATION FILED FEB. 23, 1917.
1,310,975.
Patented July 22, 1919.
2 SHEETS—SHEET 1.
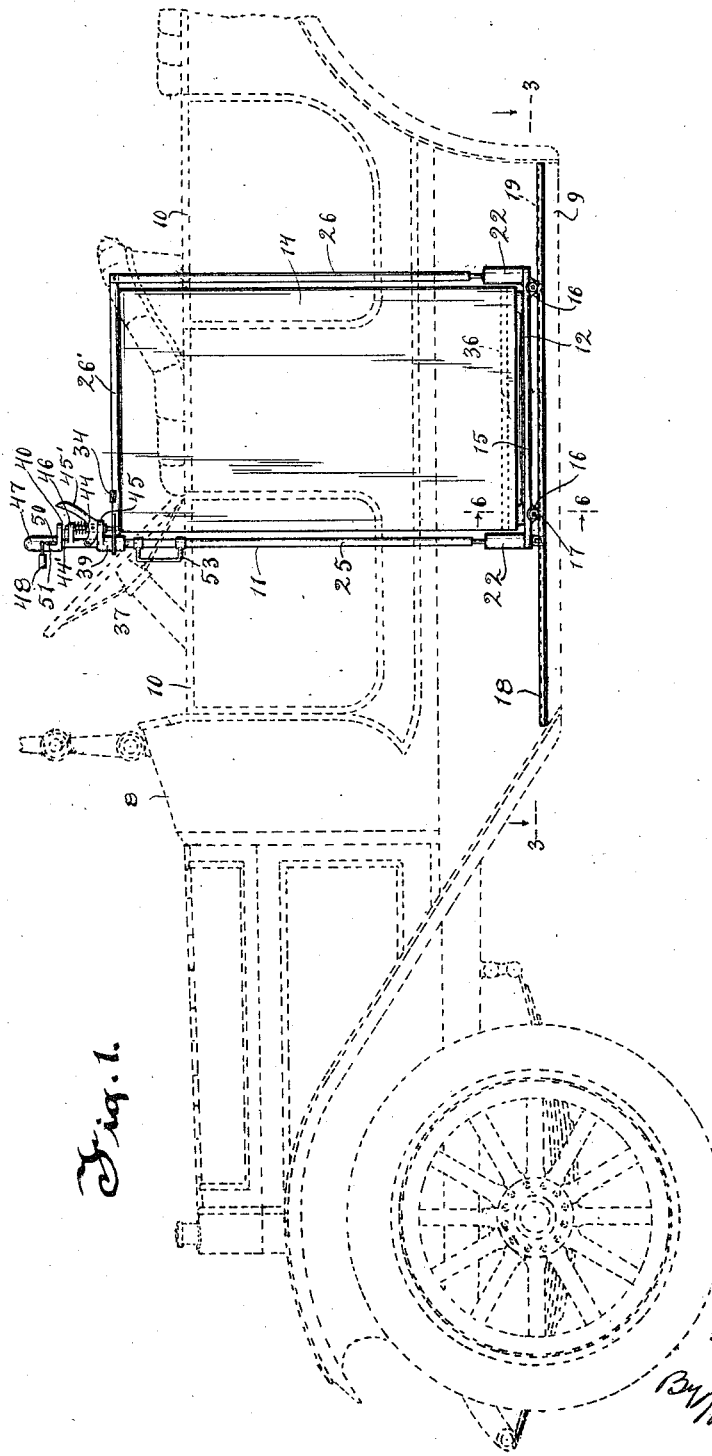
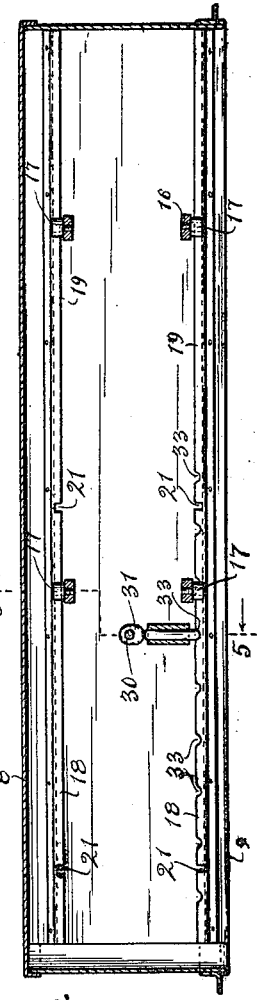
INVENTOR
George Henry Wheary
By Morsell, Keeney & French,
ATTORNEYS

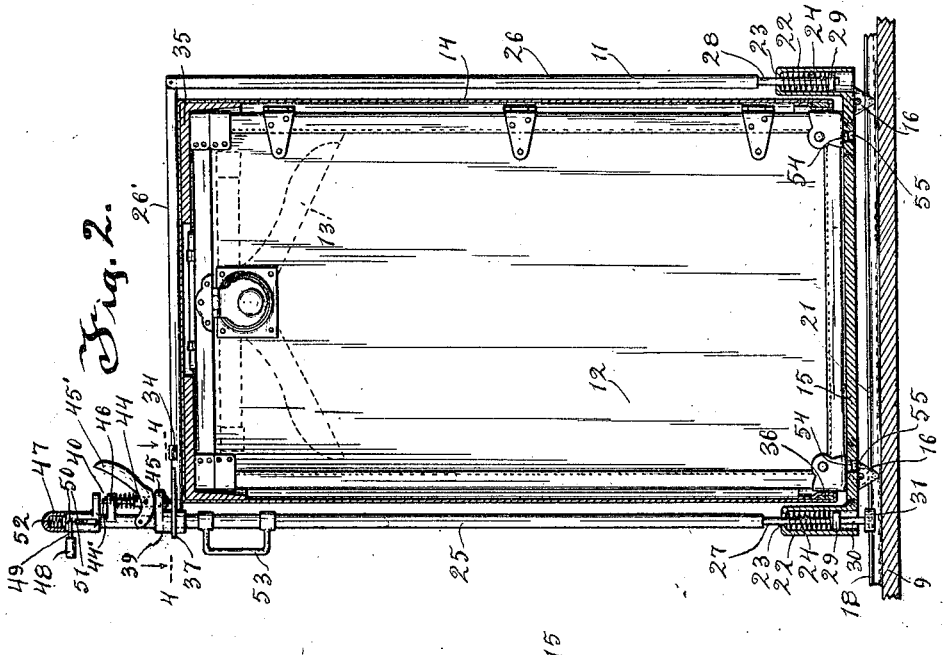

UNITED STATES PATENT OFFICE.

GEORGE HENRY WHEARY, OF RACINE, WISCONSIN.

SLIDABLE TRUNK-HOLDER.

1,310,975.  Specification of Letters Patent.  Patented July 22, 1919.

Application filed February 23, 1917. Serial No. 150,503.

*To all whom it may concern:*

Be it known that I, GEORGE HENRY WHEARY, a citizen of the United States, and resident of Racine, in the county of Racine and State of Wisconsin, have invented new and useful Improvements in Slidable Trunk-Holders, of which the following is a description, reference being had to the accompanying drawings, which are a part of this specification.

This invention relates to improvements in slidable trunk holders.

It is one of the objects of the present invention to provide a means for detachably mounting a wardrobe trunk upon the running board of an automobile in such a manner that it may be easily slid to a position to permit all of the doors of the automobile to be easily opened or closed without detaching the trunk from the holder.

A further object of the invention is to provide a slidable trunk holder in which the trunk is maintained in an upright position on the running board at any point desired and the trunk may be easily detached from the holder and removed or the holder may be easily detached from the running board and removed.

A further object of the invention is to provide a slidable trunk holder in which the trunk is yieldingly held in upright position in such a manner as to absorb to a large extent the shock and jars incidental to traveling over rough roads.

A further object of the invention is to provide a slidable trunk holder which is of simple construction, is strong and durable and is well adapted for the purpose described.

With the above and other objects in view the invention consists of the improved slidable trunk holder and its parts and combinations as set forth in the claims, and all equivalents thereof.

In the accompanying drawings in which the same reference characters indicate the same parts in all of the views:

Figure 1 is a side view of the improved slidable trunk holder shown mounted upon the running board of an automobile, the automobile being indicated by dotted lines;

Fig. 2 is an enlarged side view of the holder with the cover and other portions thereof being shown in section;

Fig. 3 is a horizontal sectional detail view thereof taken on line 3—3 of Fig. 1;

Fig. 4 is a sectional detail view taken on line 4—4 of Fig. 2;

Fig. 5 is a transverse sectional detail view taken on line 5—5 of Fig. 3; and

Fig. 6 is a vertical sectional detail view taken on line 6—6 of Fig. 1.

Referring to the drawings the numeral 8 indicates a portion of an automobile, 9 one of the running boards, 10 two of the automobile doors and 11 the improved slidable trunk holder mounted on the running board.

A wardrobe trunk 12 having garment hangers 13 supported in its upper end portion, is shown as mounted on the holder. A water and dust proof cover 14 is provided which covers practically all of the exposed portions of the trunk.

The holder comprises a base member 15 having downwardly projecting lugs 16 provided with rollers 17 journaled on their outer sides which support the base member upon the tracks 18. The tracks are of double angular form in cross section and are mounted on the running board so that their upper flanges 19 extend inwardly toward each other and the lower portions of the lugs 16 are provided with outwardly projecting locking knobs 20 which extend below the rollers and beneath the flanges 19 of the tracks and prevent the accidental displacement of the parts. In order to permit the removal of the base member when desired the upper rail flanges are provided with notches or cut away portions 21 spaced to register with the locking knobs 20 when the base member is in a certain position so that said knobs may pass through the notches in removing the said base member from the tracks.

The base member 15 is approximately of rectangular form and medially of its width at its opposite ends is provided with upstanding tubular portions 22, the upper end portions of which have openings of less diameter than the bore to form annular flanges or shoulders 23 against which coiled springs 24 positioned within the tubular portions bear. Trunk engaging members 25 and 26 extending upwardly from the tubular portions 22 have lower reduced diameter portions 27 and 28 which slidably extend into the bores of the tubular portions and through the coiled springs and are provided with collars 29 fast thereon which bear against the lower ends of the spring 24. The lower end of the member 25 is provided with an extension 30 which projects below the base member and at its lower end is provided with a cam 31. The cam engages a slidable bolt 32 carried by the base member and forces it into locking engagement with one of a plurality of locking recesses 33 formed in the flanged portion 19 of the track to hold said base member in adjusted position on the track. As the cam can slide freely vertically on the bolt the yielding connection between the member 25 and the base member will not be interferred with.

The trunk engaging member 26 is preferably, although not necessarily, formed in two parts of which the upper portion 26' is hinged to the upper end of the lower portion and swings over and rests upon the upper end of the trunk 12 and its cover 14. In engaging the upper end of the trunk cover the member 26' swings beneath a spring clip 34 which holds the parts in engagement with each other. The spring clip is firmly mounted on top of the trunk cover and the reinforcing portion 35 which forms a part of said cover. This reinforcing portion 35 is in the form of an inverted tray which extends over the upper end of the trunk and maintains the cover in position. The lower end of the cover is reinforced by a rectangular shaped metal band 36 which holds the said lower cover portion in its lower position.

The free end portion of the hinged arm is provided with a segmental locking plate 37 having a slot or recess 38 for receiving the annularly grooved portion 39 of the locking member 40. The said locking plate is provided with a segmental recess 41 having locking openings 42 and 43 at its opposite ends to receive the lower end portion of the spring pressed locking dog 44 which forms part of the locking member 40 and is actuated by the handle portion 45'. The locking opening 42 extends into the end portion of the part 26' to form a more rigid connection when in locked position. The locking dog 44 extends vertically alongside of the locking member 40 and through bearing arms 45 and 46 projecting from said member and its upper end portion 44' terminates a slight distance beneath an adjustable handle 47 slidably mounted on the upper end portion of the locking member 40. An ordinary padlock 48, the bow or shackle 49 of which may be extended through openings 50 in the handle and an opening 51 in the locking member 40, is provided to lock the handle in either one of its two positions. A coiled spring 52 positioned within the tubular portion of the handle and interposed between the handle and the upper end of the locking member 40 yieldingly holds the handle in its upper position. When the handle is in its upper position the locking dog may be raised sufficiently far to disengage the segmental recess 41 of the member 37 to permit the separation of the members 25 and 26' and the removal of the trunk from the holder. When however the handle is in its lower position as shown in Figs. 1 and 2, the upward movement of the locking dog is limited so that it can be moved to only disengage the locking openings 42 and 43 but not pass out of the segmental recess 41 so that the member 25 may be turned a quarter turn to permit locking or unlocking of said member 25 to the track. When in unlocked position the holder with the trunk locked thereto may be slid to a position on the track to permit the opening of either automobile door. A handle 53 is provided for convenience in turning the member 25. To maintain the bottom portion of the trunk in position on the holder the trunk is provided with downwardly projecting knobs 54 which enter recesses 55 formed in the base portion.

In use the holder is mounted on the running board and the trunk is covered and locked thereto in the manner described, and when it is desired to open the door of the automobile it is only necessary to unlock the holding member from the track and then slide the holder and the trunk thereon to a position out of the path of swing of the door.

While the holder is shown as mounted on only one side of the automobile it is to be understood that a holder may be mounted on both sides and that one of the trunks may be of the wardrobe type and the other of the drawer type. In supporting garments upon the hangers and maintaining the hangers in upright position, the garments will be kept in a presentable condition without the necessity of being cleaned and pressed.

From the foregoing description it will be seen that the slidable trunk holder is of very simple construction and is well adapted for the purpose described.

What I claim as my invention is:

1. A trunk holder, comprising a track, a base member slidably mounted thereon and having upright portions, trunk engaging members yieldingly connected to the upright portions and extending upwardly therefrom for lockingly engaging a trunk mounted on the base member, and means controlled by one of the trunk engaging members for locking the base member in adjusted position on the track.

2. A trunk holder, comprising a track, a base member slidably mounted thereon, upright trunk engaging members connected to the base member, means for locking the free ends of the trunk members together, and means controlled by one of the upright trunk engaging members for locking the base member in adjusted position on the track.

3. A trunk holder, comprising a track, a base member slidably mounted thereon, upright trunk engaging members yieldingly connected to the base member, means for locking the free ends of the trunk engaging members together, and means controlled by one of the upright trunk engaging members for locking the base member against movement on the track.

4. A trunk holder, comprising spaced tracks, a base member slidably mounted on the tracks, upright trunk engaging members yieldingly connected to the base member, one of said trunk engaging members having a part extending over the upper portion of a trunk mounted on the base member, means for connecting the free ends of the trunk engaging members together, and a locking means controlled by a revoluble movement of one of the upright trunk engaging members for locking the base member against movement on the track.

5. A trunk holder, comprising spaced tracks, a base member slidably mounted thereon, means for preventing the removal of the base member from the tracks except when in a certain position, upright trunk engaging members yieldingly connected to the base member, means for locking the free ends of the trunk engaging members together, and a locking means controlled by a revoluble movement of one of the trunk engaging members for locking the base member against movement on the track.

6. A trunk holder, comprising spaced tracks, a base member slidably mounted thereon, means for preventing the removal of the base member from the tracks except when in a certain position, upright trunk engaging members yieldingly connected to the base member, a trunk cover engaged by the trunk engaging members and adapted to partly cover a trunk mounted on the base member, means for locking the free ends of the trunk engaging members together, and a locking means controlled by a revoluble movement of one of the trunk engaging members for locking the base member against movement on the track.

7. A trunk holder, comprising spaced tracks, a base member slidably mounted thereon, means for preventing the removal of the base member from the tracks except when in a certain position, a locking member carried by base member and engaging certain portions of the tracks, upright trunk engaging members connected to the base member, and means for locking the free ends of the trunk engaging members together, one of said trunk engaging members controlling the base locking member.

8. A trunk holder, comprising spaced tracks, a base member slidably mounted thereon, means for preventing the removal of the base member from the tracks except when in a certain position, a locking member carried by the base member and engaging certain portions of the tracks, upright trunk engaging members yieldingly connected to the base member, and means for locking the free ends of the trunk engaging members together, one of said trunk engaging members controlling the base locking member.

9. A trunk holder, comprising spaced tracks, a base member slidably mounted thereon, means for preventing the removal of the base member from the tracks except when in a certain position, a locking member carried by the base member and engaging certain portions of the tracks, upright trunk engaging members yieldingly connected to the base member, a trunk cover engaged by the trunk engaging members and adapted to partly cover a trunk mounted on the base member, and means for locking the free ends of the trunk engaging members together, one of said trunk engaging members controlling the base locking member to permit the unlocking of the same without unlocking the ends of the trunk engaging members.

10. A trunk holder, comprising spaced tracks, a base member slidably mounted thereon, means for preventing the removal of the base member from the tracks except when in a certain position, a locking member carried by the base member and engaging certain portions of the tracks, upright trunk engaging members yieldingly connected to the base member, a trunk cover engaged by the trunk engaging members and adapted to partly cover a trunk mounted on the base member, and means for locking the free ends of the trunk engaging members together, one of said trunk engaging members having a cam connection with the base locking member to unlock the same without unlocking the ends of the trunk engaging members.

In testimony whereof I affix my signature.

GEORGE HENRY WHEARY.

Copies of this patent may be obtained for five cents each, by addressing the "Commissioner of Patents, Washington, D. C."